United States Patent [19]

Okada et al.

[11] Patent Number: 4,635,113
[45] Date of Patent: Jan. 6, 1987

[54] APPARATUS FOR DESCRAMBLING TRANSMITTED SCRAMBLED TELEVISION SIGNALS

[75] Inventors: Takashi Okada, Kanagawa; Takao Mogi; Shoji Ohmori, both of Tokyo; Yutaka Tanaka, Kanagawa; Hiroyuki Kobayashi, Tokyo, all of Japan

[73] Assignee: Sony Corporation, Tokyo, Japan

[21] Appl. No.: 626,155

[22] Filed: Jun. 29, 1984

[30] Foreign Application Priority Data

Jul. 7, 1983 [JP] Japan ................................ 58-123614

[51] Int. Cl.⁴ ............................................ H04N 7/167
[52] U.S. Cl. ..................................... 358/124; 358/122
[58] Field of Search ....................... 358/123, 124, 122

[56] References Cited

U.S. PATENT DOCUMENTS 3,924,059 12/1975 Horowitz ............................ 358/124

FOREIGN PATENT DOCUMENTS 841627 7/1960 United Kingdom ................ 358/124

Primary Examiner—Stephen C. Buczinski
Assistant Examiner—Aaron J. Lewis
Attorney, Agent, or Firm—Lewis H. Eslinger; Alvin Sinderbrand

[57] ABSTRACT

This invention relates to an apparatus for descrambling scrambled television signals including a scrambled video signal having a first scrambling pattern, a scrambled control signal having a second scrambling pattern, and descrambling signals.

4 Claims, 13 Drawing Figures

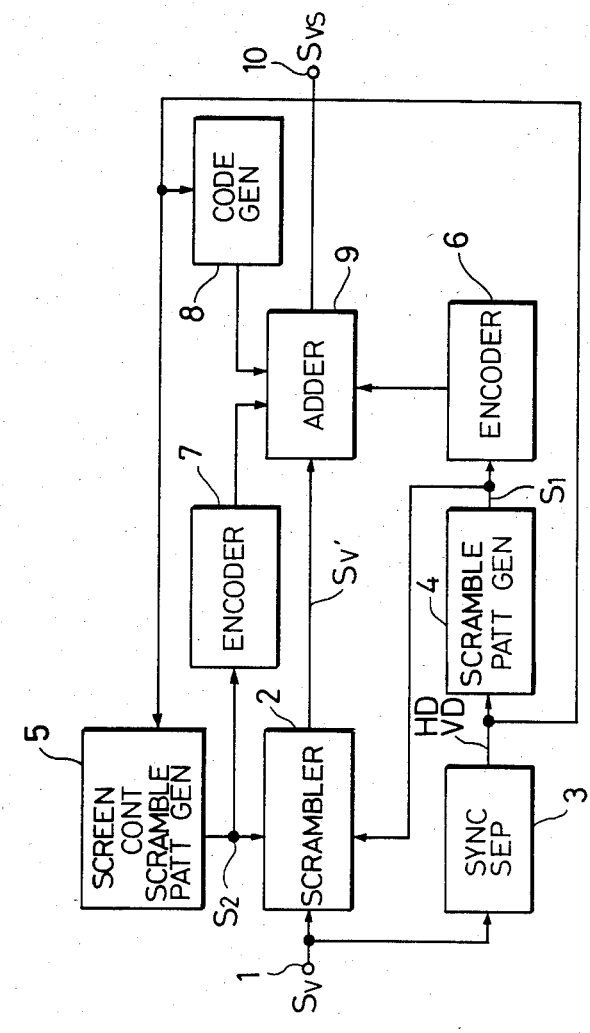

APPARATUS FOR DESCRAMBLING TRANSMITTED SCRAMBLED TELEVISION SIGNALS

BACKGROUND OF THE INVENTION

I. Field of the Invention

Recently, "pay-TV" systems have become popular in the U.S.A. In such pay-TV systems, viewers who have contracts with the broadcasting station (subscribers) can correctly receive a program, while viewers who do not have contracts with the broadcasting station (nonsubscribers) cannot. In order to prevent correct reception by nonsubscribers, scrambling methods which process a video signal are used, so that a nonsubscriber who receives a program cannot watch a correct picture. Various scrambling methods for processing a video signal have been proposed. A pay-TV system using such a scrambling method provides a subscriber with a decoder for decoding (or descrambling) the scrambled signal to obtain the original signal.

II. Description of the Prior Art

One conventional scrambling method inverts is white and black levels about a predetermined reference level or turn-up level. For example, a video signal $S_v$ shown in FIG. 1A has its polarity inverted about the turn-up level $V_m$ which is set between the white and black levels to form a scrambled video signal $S_{vs}$, shown in FIG. 1B. In this case, if vertical and horizontal synchronizing pulses of the video signal were inverted, it would be difficult to descramble the signal. Thus, only a video period is inverted.

In practice, when the level-inversion scrambling method is used in a broadcasting system, a scrambled pattern is formed in an arbitrary arrangement of level-inverted and non-inverted field periods, as shown in FIG. 2 and is transmitted repeatedly. Simultaneously, an identification signal ID which indicates that the broadcasting program is scrambled, and a key code signal KY which is used for descrambling the scrambled pattern, are inserted at predetermined positions ID+KY of FIG. 2 of a vertical blanking interval, respectively. In one scrambling method, for example, the identification signal ID having a constant level is inserted in the sixteenth horizontal scanning period of the vertical blanking interval, and the key code signal KY is inserted in the seventeenth and eighteenth horizontal scanning periods of the vertical blanking interval.

To receive the scrambled television signal as described above, the level-inverted field period is detected based on the key code signal KY, and then descrambling is performed by reinverting the signal during this period to obtain the original video signal. The turn-up level for reinversion is formed at the receiver corresponding to the turn-up level $V_m$ at the transmitter. If the turn-up level at the receiver was subjected to the influence of variations in the electronic components having ambient temperature fluctuations, for example, the reinversion would not result in the reproduction of the original waveform. As shown in FIG. 3A, when the signal $S_{vs}$ which is inverted about the turn-up level $V_m$ at the transmitter is reinverted about the identical level $V_m$ at the receiver, the waveform equal to the original one of the signal $S_v$ shown in FIG. 1A can be obtained. However, as shown in FIG. 3B, when the signal is reinverted about a turn-up level having an offset of an amount $\Delta V_m$, the signal $S_v'$ having the distorted waveform indicated by the solid line will be obtained instead of the correct signal $S_v$ indicated by the dotted line.

In order to solve this problem, it has been suggested that the level of the identification signal ID set at the identification level related to the turn-up level $V_m$ be transmitted. As shown in FIG. 4, the identification signal ID which has the level $V_m'$ and is inserted in the sixteenth horizontal scanning period (16H) has a known value relative to the turn-up level $V_m$ (in FIG. 3, $V_m' = V_m$). Therefore, the identification signal ID is transmitted for serving also as a reference level signal for descrambling.

Even if the level of the video signal varies during transmission, the turn-up level based on the level of the signal $V_m'$ and used for reinversion provides accurate descrambling because the level of the identification signal ID varies with the video signal. Thus, no special adjustment need be performed at the receiver side.

There has also been suggested a system in which a scrambled broadcasting program is transmitted after midnight, for example, and is first recorded on a tape by a VTR, and the recorded tape is later reproduced for descrambling. In this system, the scrambled signal is recorded directly, and when being reproduced, the reproduction signal is descrambled through a decoder in order to obtain a correct image. However, when the scrambled signal which has a turn-up level (to be referred to as an inverse level hereinafter) $V_m$ is recorded or reproduced, the following problem occurs due to nonlinear characteristics of the VTR and variations in their other characteristics.

FIG. 5 shows the input/output characteristics of the VTR. A curve A indicates signal characteristics of the normal portion (FIG. 2) of the signal, and a curve B indicates the signal characteristics of the signal portion inverted with respect to a 50% inverse level (half-way between the black level and the white level). As is apparent from FIG. 5, the signal characteristics of the normal field are different from those of the inverted field. The distortion in the reinverted signal becomes different from that of the normal portion of the signal. The reproduced pictures flicker at the time that the normal portion is inverted or the inverted portion is reinverted when the scrambled signal $S_{vs}$ in FIG. 2 is descrambled.

A turn-up level control circuit must be used in the receiver system described above. A viewer or a person who installs a descrambler must adjust the descrambler. When the person who installs the descrambler performs the adjustment of the descrambler, the installation cost is increased. In addition to this disadvantage, when the viewer replaces a VTR with a new one, readjustment of the descrambler is required. When the viewer adjusts the descrambler, the adjustment requires skill. As a result, fine adjustment cannot be performed, and the viewer watches the screen pictures with degraded quality.

SUMMARY OF THE INVENTION

It is an object of the present invention to provide an apparatus for descrambling scrambled television signals, wherein a viewer receiving scrambled television signals can easily perform screen control.

It is another object of the present invention to provide an apparatus for descrambling scrambled television signals, wherein screen control can be easily performed by using a picture control pattern derived from a screen control signal inserted in a scrambled television signal.

It is still another object of the present invention to provide an apparatus for descrambling scrambled television signals, wherein the screen control can be performed by level control of a scrambled portion of the scrambled television signal.

It is a further object of the present invention to provide an apparatus for descrambling scrambled television signals, wherein pictures which are substantially free from flicker can be obtained by the level control described above.

It is a still further object of the present invention to provide an apparatus for descrambling scrambled television signals that is suitable for use in a system receiving the scrambled television signals by means of a VTR.

BRIEF DESCRIPTION OF THE DRAWINGS

FIG. 8 is a block diagram of a sending-side apparatus;

DETAILED DESCRIPTION OF THE PREFERRED EMBODIMENT

Figure 6:
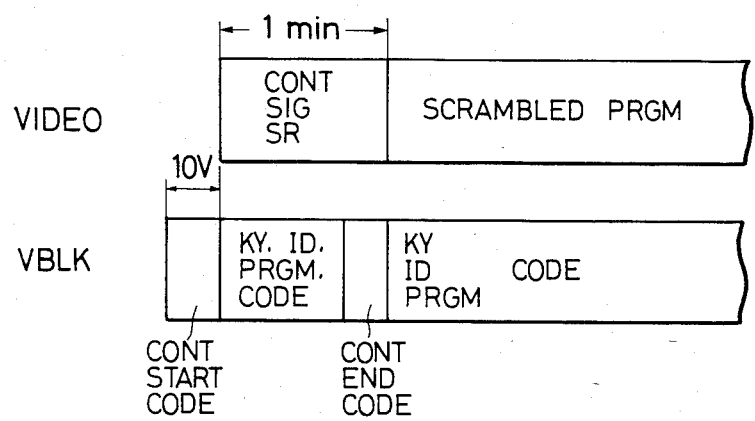
FIG. 6 shows the signal format of the initial portion of the scrambled television signal.

FIG. 6 shows the format of a scrambled television or video signal sent from a broadcast station.

During the video period, a screen control signal SR is sent from the broadcast station for one minute, and a scrambled program follows the screen control signal SR. During the vertical blanking period, a control start code is sent prior to 10 V (where V is the field) before the signal SR is sent. ID, KY and program codes follow the control start code. A control end code is inserted in the midst of the KY, ID and program codes of the vertical blanking period at the end of the signal SR. Meanwhile, the audio signals can be scrambled by using the scrambling pattern in accordance with any technique in the audio channel. Any one of the above-described codes is obtained such that a binary signal having a predetermined number of bits is NRZ-modulated.

The key code KY is a deciphering key code for descrambling the scrambled video signal and has a code for designating the scrambling pattern. The screen control signal SR is used to display the control pattern for one minute before the program is displayed. The control start signal may be detected to start the VTR or the descrambler.

Figures 7A, 7B:
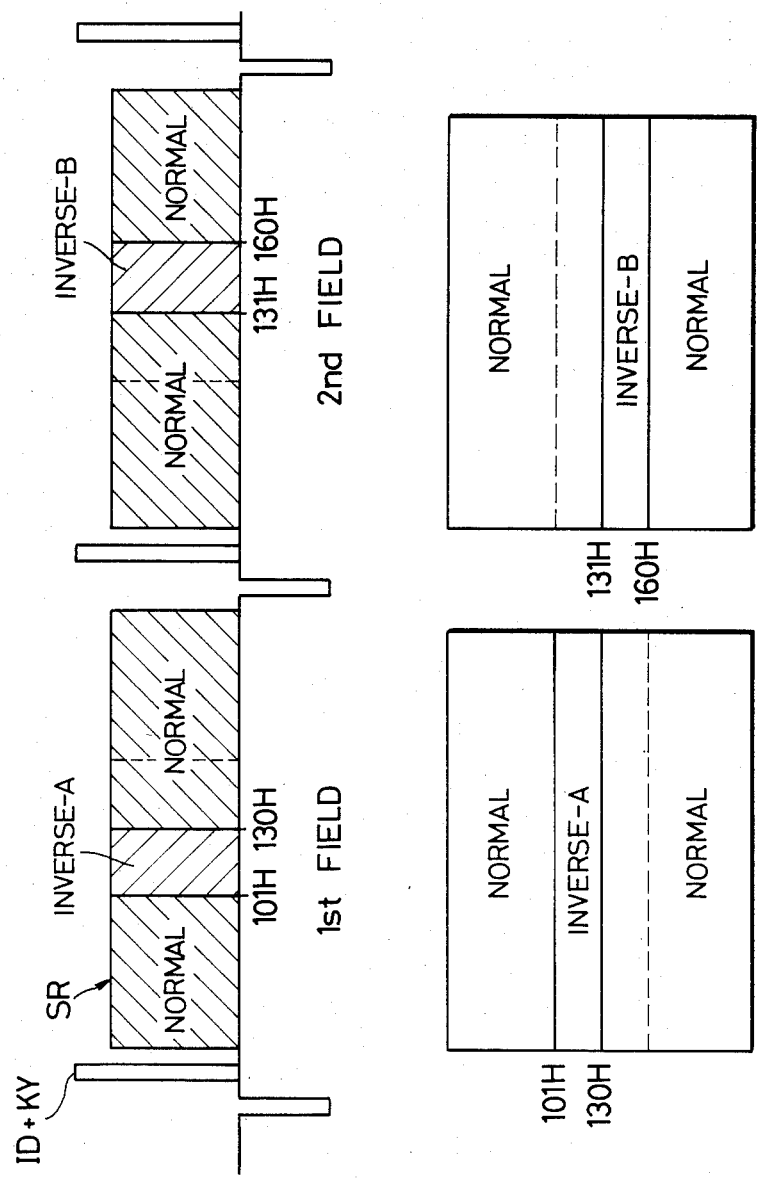
FIGS. 7A and 7B show the screen control signal and a 2-field picture, respectively.

The screen control signal SR is scrambled as shown in FIG. 7A, and is displayed on the screen as shown in FIG. 7B if it is not descrambled. The screen control signal SR forms an inverse-A at substantially the center of the screen in the range of 101H to 130H and an inverse-B in the range of 131H to 160H. The inverse-A and inverse-B are alternately formed in every field. In this manner, the screen control signal SR has a scrambling pattern different from that of the program.

The inverse-A and inverse-B of the screen control signal SR are reinverted by the descrambler. When the reinverted components are directly applied to the CRT, the picture flickers. Therefore, the inverse level for reinversion must be controlled to minimize flicker. This control is performed by means of a control knob operated by the viewer. This control operation can be easily performed by any viewer. The contents of the inverse-A and inverse-B may comprise monochrome video components. In such case, flicker is emphasized at the horizontal scanning lines 101H, 130H, 131H and 160H, so that the viewer can easily control the picture to minimize flicker.

FIG. 8 is a schematic block diagram showing a sending-side apparatus for producing television signals of FIG. 6.

A video signal $S_v$ of a specific program is supplied to an input terminal 1. The video signal $S_v$ is then supplied to a scrambler 2 and a sync separator 3, and horizontal and vertical sync pulses HD and VD are separated from the video signal $S_v$. A scramble pattern generator 4 generates a predetermined scrambling pattern signal $S_1$ in response to the horizontal and vertical sync pulses HD and VD. The scrambler 2 inverts a predetermined field period of the video signal $S_v$ in accordance with the predetermined scrambling pattern signal $S_1$. A screen control scramble pattern generator 5 generates a screen control scrambling pattern signal $S_2$ shown in FIG. 7A so as to scramble the signal for one minute prior to the program. The signals $S_1$ and $S_2$ are digitally coded as key codes by encoders 6 and 7, respectively. Therefore, the key codes include a key code for deciphering the signal SR and a key code for deciphering the scrambled program. These key codes and the various codes such as a program code formed by a code generator 8 are inserted by an adder 9 in a predetermined period of a scrambled signal $S_v'$. The signal with the various codes inserted therein appears as a scrambled television signal $S_{vs}$ at an output terminal 10.

Figure 9:
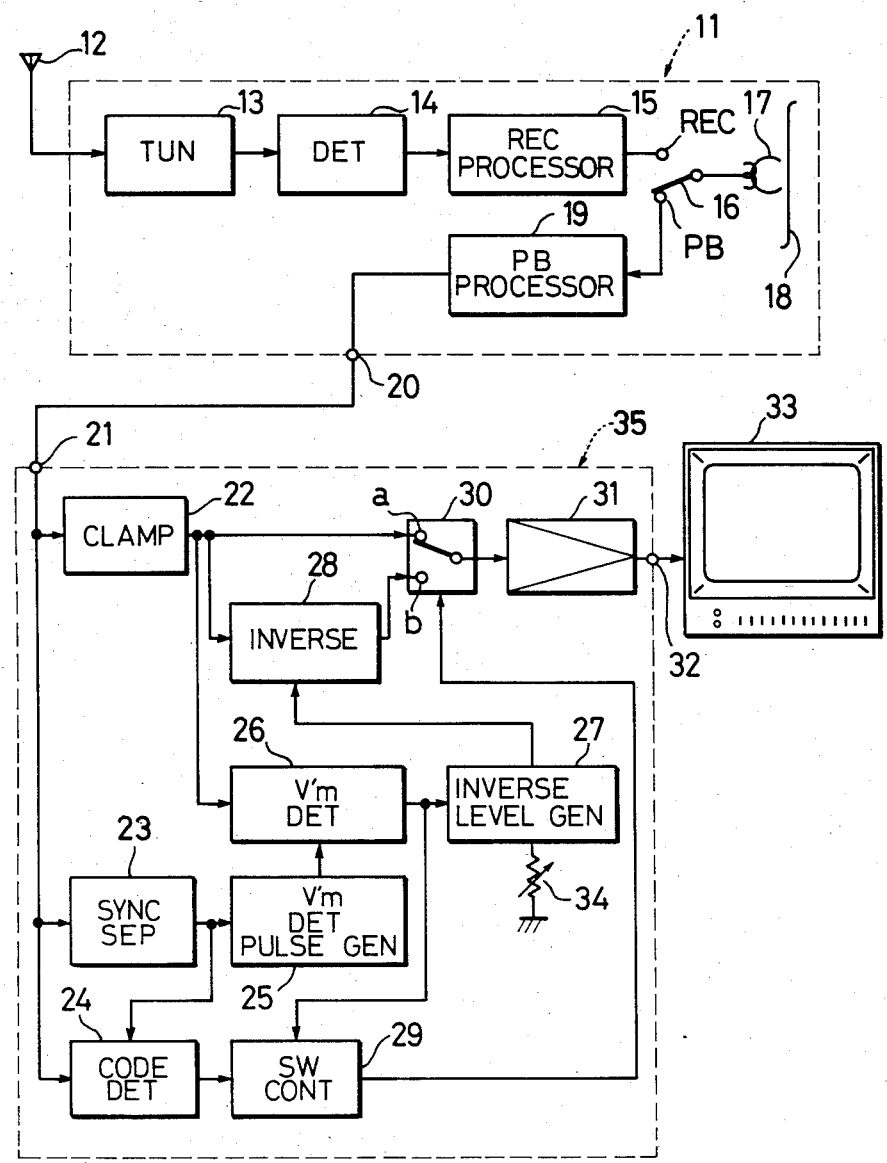
FIG. 9 is a block diagram of a receiving-side apparatus which embodies the present invention.

FIG. 9 schematically illustrates a video signal receiving apparatus which includes a descrambling circuit 35 according to an embodiment of this invention, a VTR 11 and a monitor 33.

In FIG. 9, the VTR 11 receives a broadcasting signal from an antenna 12. The received signal is provided to a tuner 13 in order to select a scrambled television signal and the signal selected by the tuner 13 is provided to a detector 14. After detection, the detector 14 supplies the signal to a recording processor 15 which, in the conventional manner, frequency modulates a Y signal and converts chrominance signals to a lower frequency. The signal from the recording processor 15 is supplied to a record terminal REC of a switch 16. When the switch 16 provides a circuit path through the terminal REC, the received signal is supplied to a magnetic head 17 for recording on a magnetic tape 18.

When the recorded signal is reproduced, the reproduction signal is supplied to a playback processor 19 which demodulates the Y signal and converts the chrominance signals to the original higher frequency through a playback terminal PB of the switch 16. Then, the Y signal and the chrominance signals are synthesized to provide a composite video signal. The reproduced signal is supplied to a video output terminal 20.

The descrambling circuit 35 has an input terminal 21 that accepts the composite signal.

The composite signal is supplied to a clamping circuit 22, and the pedestal level of the composite signal is clamped therein. Horizontal and vertical synchronizing pulses in the composite signal are separated by a sync separating circuit 23. Simultaneously, a code detector 24 detects the key code signal based on the horizontal and vertical synchronizing pulses from the circuit 23. A detecting pulse generator 25 generates a detecting pulse for detecting a turn-up level $V_m'$ based on the horizontal and vertical synchronizing pulses in order to detect the identification signal ID inserted in the sixteenth horizontal scanning period. The clamped signal from the circuit 22 is supplied to a detecting circuit 26 for detecting the level $V_m'$. Then, the turn-up level $V_m'$ of the signal is detected in the detecting circuit 26 in accordance with the detecting pulse from the generator 25. Based on the detected level $V_m'$, an inverse level generator 27 together with a variable resistor 34 forms a control means providing a controlled inverse level (or turn-up level) for descrambling in accordance with the level $V_m'$. Then, an inverting circuit 28 inverts the level of the signal from the clamping circuit 22 in accordance with the inverse level and together with a switch 30 constitutes a descrambling means.

Sync separator 23 and code detector 24 together with a switching control circuit 29 form a descrambling pattern generator which recovers the scrambling pattern in accordance with the detected key code signal and the detected level $V_m'$, that is, the signal ID. The switching control circuit 29 then detects a scrambling pattern consisting of the level-inverted period and the non-inverted period of the input composite signal. Then, the switching circuit 29 generates a descrambling pattern signal. In response to the descrambling pattern signal, in the case of the level-inverted period, switch 30 is changed over to a contact b, and in the case of the non-inverted period, the switch 30 is at a contact a. Therefore, when the switch 30 is at the contact a, the composite signal is directly provided from the switch 30. On the contrary, when the switch 30 is at the contact b, the inverted, that is, the reinverted, original level signal is provided from the switch 30. Accordingly, a completely descrambled signal can be obtained. The completely descrambled signal is output from an output terminal 32 through a buffer amplifier 31. Therefore, the output signal at the output terminal 32 is supplied to the monitor 33 in order to view a correct image.

Figure 1A:
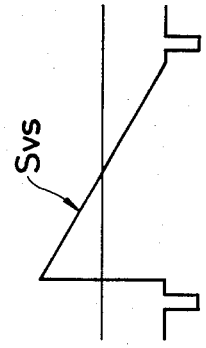
FIGS. 1A and 1B show waveforms of video signals for explaining level inversion, respectively.
Figure 1B:
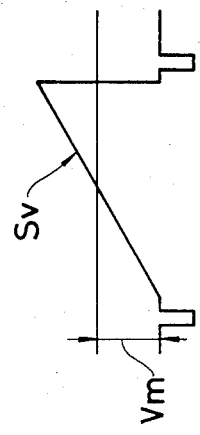
Figure 2:
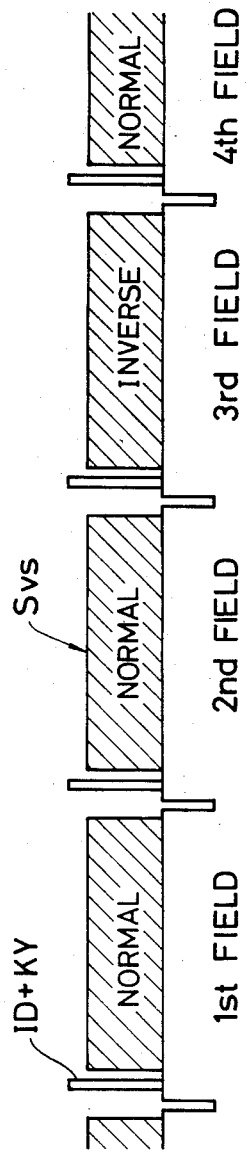
FIG. 2 shows a waveform of the scrambled video signal.
Figure 3A:
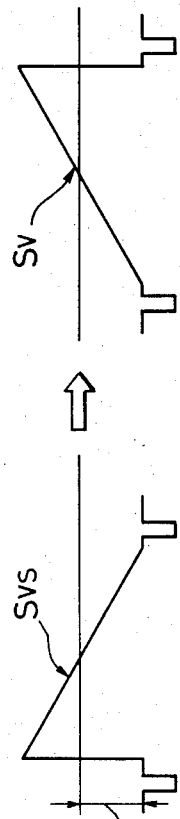
FIGS. 3A and 3B show waveforms of video signals for explaining reinversion of the inverted video signals, respectively.
Figure 3B:
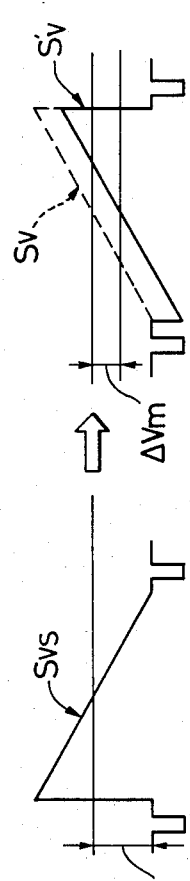
Figure 4:
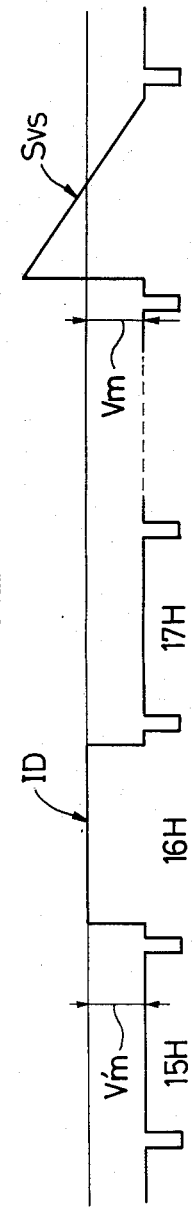
FIG. 4 shows a waveform for explaining the relationship between an ID signal and the inverted signal.
Figure 5:
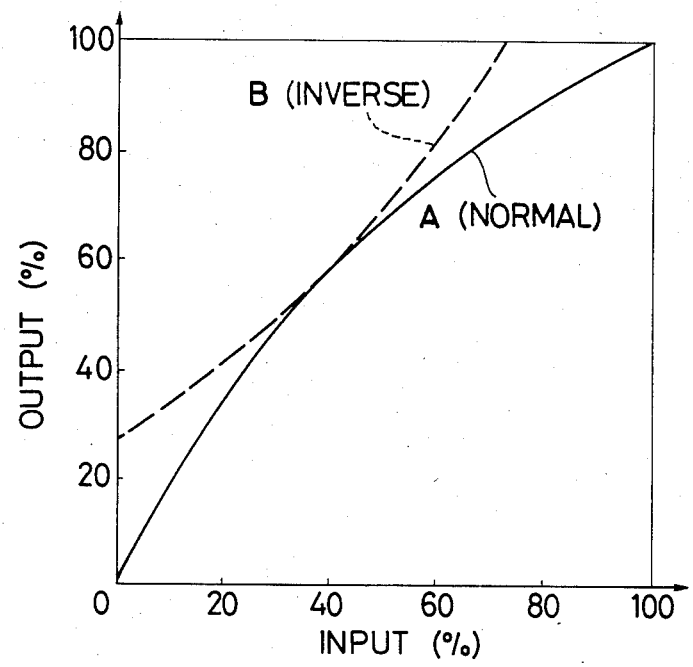
FIG. 5 is a graph showing the input/output characteristics of a VTR.
Figure 10:
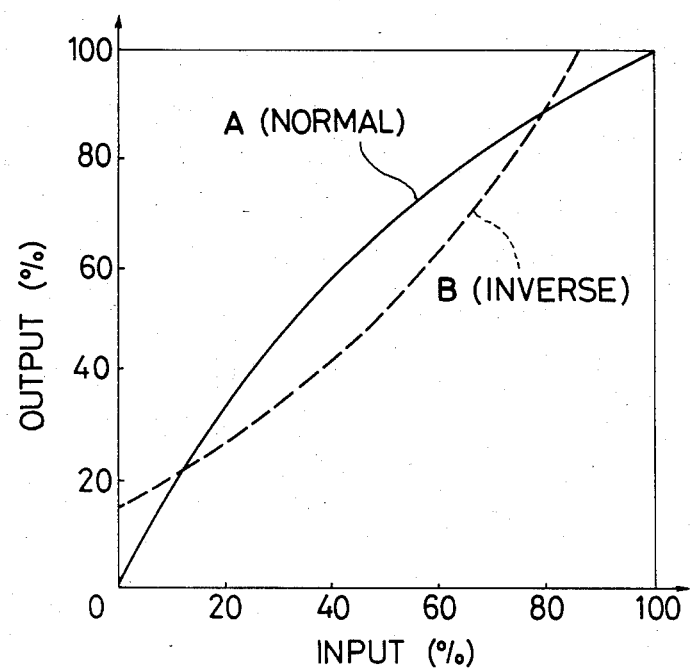
FIG. 10 is a graph showing the input/output characteristics of the VTR after the inverse level is controlled.

The screen control pattern descrambled from that shown in FIG. 7B is displayed on the screen of the monitor 33 for one minute. The viewer controls the inverse level by means of variable resistor 34 in the inverse level generator 27 to minimize flicker. Therefore, the difference between the characteristic curves A and B of FIG. 5 is minimized, as shown in FIG. 10. When the inverse level is thus controlled, the scrambled program is descrambled in accordance with this inverse level. As a result, flicker of the playback picture can be minimized. In the above embodiment, the signal SR is followed by the program. However, the signal SR may be inserted in or after the program.

What is claimed is:

1. Apparatus for descrambling transmitted scrambled television signals which include a scrambled video signal having selected fields inverted in polarity about a predetermined turn-up level in accordance with a first scrambling pattern, a scrambled screen control signal transmitted in lieu of said video signal for a predetermined period comprised of a plurality of fields during which adjacent portions of successive fields are alternately inverted about said predetermined turn-up level in accordance with a second scrambling pattern, and descrambling signals including key code signals respectively signifying said first and second scrambling patterns and an identification signal having a level proportionate to said predetermined turn-up level, the apparatus comprising:

monitor means;

means for detecting said key code signals signifying said first and second scrambling patterns and providing corresponding first and second descrambling pattern signals;

means for detecting the level of said identification signal as an indication of said turn-up level of said scrambled video signal and scrambled screen control signal, as received;

means receiving the detected identification signal level for generating therefrom a controlled turn-up level and including control means actuable for adjusting said controlled turn-up level; and descrambling means including inverting means receiving said controlled turn-up level and being operative in response to said second descrambling pattern signal to selectively reinvert about said controlled turn-up level the inverted portions of the scrambled screen control signal for descrambling the latter and displaying the descrambled screen control signal on the monitor means while said control means is actuated to adjust said controlled turn-up level in the sense for eliminating any flicker from the display, whereupon, said inverting means is made operative in response to said first descrambling pattern signal to selectively reinvert said inverted fields of said scrambled video signal with reference to the adjusted controlled turn-up level for accurate display on said monitor means of the resulting descrambled video signal.

2. Apparatus for descrambling transmitted scrambled television signals according to claim 1, in which said adjacent portions of said successive fields of the scrambled screen control signal are comprised of monochrome signals.

3. Apparatus for descrambling transmitted scrambled television signals according to claim 1; further comprising video recorder means for recording and reproducing the transmitted signals prior to the descrambling thereof.

4. Apparatus for descrambling transmitted scrambled television signals according to claim 1; in which said control means includes variable resistor means.

* * * * *